(12) United States Patent
Shono et al.

(10) Patent No.: US 8,473,165 B2
(45) Date of Patent: Jun. 25, 2013

(54) TURNING DRIVE CONTROL APPARATUS AND CONSTRUCTION MACHINE INCLUDING THE SAME

(75) Inventors: Hiroso Shono, Yokosuka (JP); Noriyuki Nishiyama, Niihama (JP); Kiminori Sano, Chiba (JP)

(73) Assignees: Sumitomo Heavy Industries, Ltd., Tokyo (JP); Sumitomo (S. H. I) Construction Machinery Co., Ltd., Tokyo (JP)

( * ) Notice: Subject to any disclaimer, the term of this patent is extended or adjusted under 35 U.S.C. 154(b) by 225 days.

(21) Appl. No.: 12/682,902

(22) PCT Filed: Oct. 17, 2008

(86) PCT No.: PCT/JP2008/068905
§ 371 (c)(1),
(2), (4) Date: Apr. 14, 2010

(87) PCT Pub. No.: WO2009/051247
PCT Pub. Date: Apr. 23, 2009

(65) Prior Publication Data
US 2010/0222970 A1    Sep. 2, 2010

(30) Foreign Application Priority Data
Oct. 18, 2007    (JP) .................... 2007-271656

(51) Int. Cl.
*G06F 7/70*    (2006.01)
(52) U.S. Cl.
USPC ............ 701/50; 318/652; 318/284; 318/468; 318/638; 318/561; 180/65.21; 180/331

(58) Field of Classification Search
USPC .............. 701/50; 318/24, 284, 468, 638, 561, 318/652, 461, 798; 180/65.21, 331
See application file for complete search history.

(56) References Cited

U.S. PATENT DOCUMENTS

| | | | | |
|---|---|---|---|---|
| 4,611,205 | A | * | 9/1986 | Eglise .................... 340/10.32 |
| 5,848,485 | A | * | 12/1998 | Anderson et al. ............... 37/348 |
| 6,078,855 | A | * | 6/2000 | Kinugawa et al. .............. 701/50 |
| 6,851,207 | B2 | * | 2/2005 | Yoshimatsu .................... 37/348 |
| 6,959,241 | B2 | * | 10/2005 | Itow et al. ..................... 701/102 |
| 7,362,071 | B2 | | 4/2008 | Morinaga et al. |
| 7,743,874 | B2 | * | 6/2010 | Yasui et al. ................... 180/444 |
| 7,746,067 | B2 | * | 6/2010 | Brandt et al. ............ 324/207.25 |

(Continued)

FOREIGN PATENT DOCUMENTS

| | | |
|---|---|---|
| JP | 2004-036303 | 2/2004 |
| JP | 2005-307587 | 11/2005 |
| WO | WO 2005/111321 | 11/2005 |

*Primary Examiner* — McDieunel Marc
(74) *Attorney, Agent, or Firm* — IPUSA, PLLC

(57) ABSTRACT

A turning drive control apparatus that controls a drive of a turning mechanism of a construction machine driven to turn by an electric motor, includes: a drive command creation part that creates a drive command to drive the electric motor based on an amount of operation input through an operation part of the construction machine; a turning motion detection part that detects a turning motion of the turning mechanism; and a drive command correction part that corrects the drive command, when a turning motion in a direction opposite to a turning operation direction input to the operation part is detected by the turning motion detection part, to suppress the turning motion in the direction opposite to the turning operation direction in response to a degree of the turning motion in the direction opposite to the turning operation direction.

5 Claims, 6 Drawing Sheets

U.S. PATENT DOCUMENTS

| | | | |
|---|---|---|---|
| 7,869,923 B2 * | 1/2011 | Kawaguchi | 701/50 |
| 2005/0253542 A1 | 11/2005 | Sugano et al. | |
| 2007/0216331 A1 * | 9/2007 | Morinaga et al. | 318/561 |
| 2008/0065298 A1 * | 3/2008 | Kawaguchi | 701/50 |

* cited by examiner

TURNING DRIVE CONTROL APPARATUS AND CONSTRUCTION MACHINE INCLUDING THE SAME

TECHNICAL FIELD

The present invention relates to a turning drive control apparatus that performs a drive control of a turning mechanism of a construction machine and a construction machine including that.

BACKGROUND ART

Conventionally, there is suggested a construction machine of which a part of a drive mechanism is motorized. Such a construction machine is equipped with an electric motor as a power source of a turning mechanism for rotating an upper turning body in order to accelerate (drive) the turning mechanism by a power running operation of the electric motor and, when decelerating (braking) the turning mechanism, performing a regenerative operation to charge the generated electric power to a battery (for example, refer to Patent Document 1). Moreover, the construction machine disclosed in Patent Document 1 is equipped with a hydraulic pump to hydraulically drive a drive mechanism other than a turning mechanism, and a generator is connected to an engine for driving the hydraulic pump via a speed-up gear to use electric power acquired by generation for charging a battery and driving the electric motor of the turning mechanism.

Patent Document 1: Japanese Laid-Open Patent Application No. 2004-036303

DISCLOSURE OF THE INVENTION

Problems to be Solved by the Invention

In the meantime, a work mechanism such as a boom, an arm, etc., is mounted to the upper-part turning body, which is rotated by the turning mechanism, in addition to a cabin and an engine. Because the work mechanism has a large weight, the inertia moment of the upper turning body differs greatly between a state where the boom and the arm are extended and a state where they are retracted, and the inertia moment is larger in the state where the boom and the arm are extended.

For this reason, if the inertia moment is large, a displacement between the center of rotation and the center of gravity is large, which requires a larger driving torque to drive the electric motor of the turning mechanism.

Thus, according to the invention disclosed in Patent Document 1, which does not take an inertia moment into consideration, in a case where an operator performs a turning operation in a direction in which the work mechanism ascends a slope, it is difficult to create an appropriate drive instruction in a state where the inertia moment is large, and a driving torque of the electric motor of the turning mechanism is insufficient and it cannot be larger than a rotation torque according to the slope inclination, which may result in a case where the work mechanism turns in a direction opposite to the direction of the turning operation by the operator.

Accordingly, it is an object of the present invention to provide a turning drive control apparatus, which can perform a turning operation stably even on a sloping ground, and a construction machine including the same.

Means to Solve Problems

A turning drive control apparatus according to an aspect of the present invention is a turning drive control apparatus that controls a drive of a turning mechanism of a construction machine driven to turn by an electric motor, including: a drive command creation part that creates a drive command to drive the electric motor based on an amount of operation input through an operation part of the construction machine; a turning motion detection part that detects a turning motion of the turning mechanism; and a drive command correction part that corrects the drive command, when a turning motion in a direction opposite to a turning operation direction input to the operation part is detected by the turning motion detection part, to suppress the turning motion in the direction opposite to the turning operation direction in response to a degree of the turning motion in the direction opposite to the turning operation direction.

Additionally, the drive command correction part may correct the drive command based on a zero speed command to set a rotation speed of the electric motor to zero and a degree of the turning motion detected by the turning motion detection part.

Additionally, the drive command correction part may be configured to compute a value of the drive command for correction based on a value of the zero speed command and a value representing the degree of the turning motion detected by the turning motion detection part in order to add the value of said drive command for correction to the value of the drive command created by the drive command creation part when a direction of the turning motion detected by the turning motion detection part is the direction opposite to said turning operation direction, and set the value of the drive command for correction added to the value of the drive command to zero when a direction of the turning motion detected by the turning motion detection part is coincident with the turning operation direction.

Additionally, a first control gain of the drive command correction part to compute a value of the drive command for correction may be set larger than a second control gain of the drive command creation part to create the drive command.

A construction machine according to one aspect of the present invention includes one of the above-mentioned turning drive control apparatuses.

EFFECT OF THE INVENTION

According to the present invention, a specific effect that a turning drive control apparatus, which can perform a turning operation stably even on a sloping ground, can be obtained, and a construction machine including the same can be provided.

Figure 1:
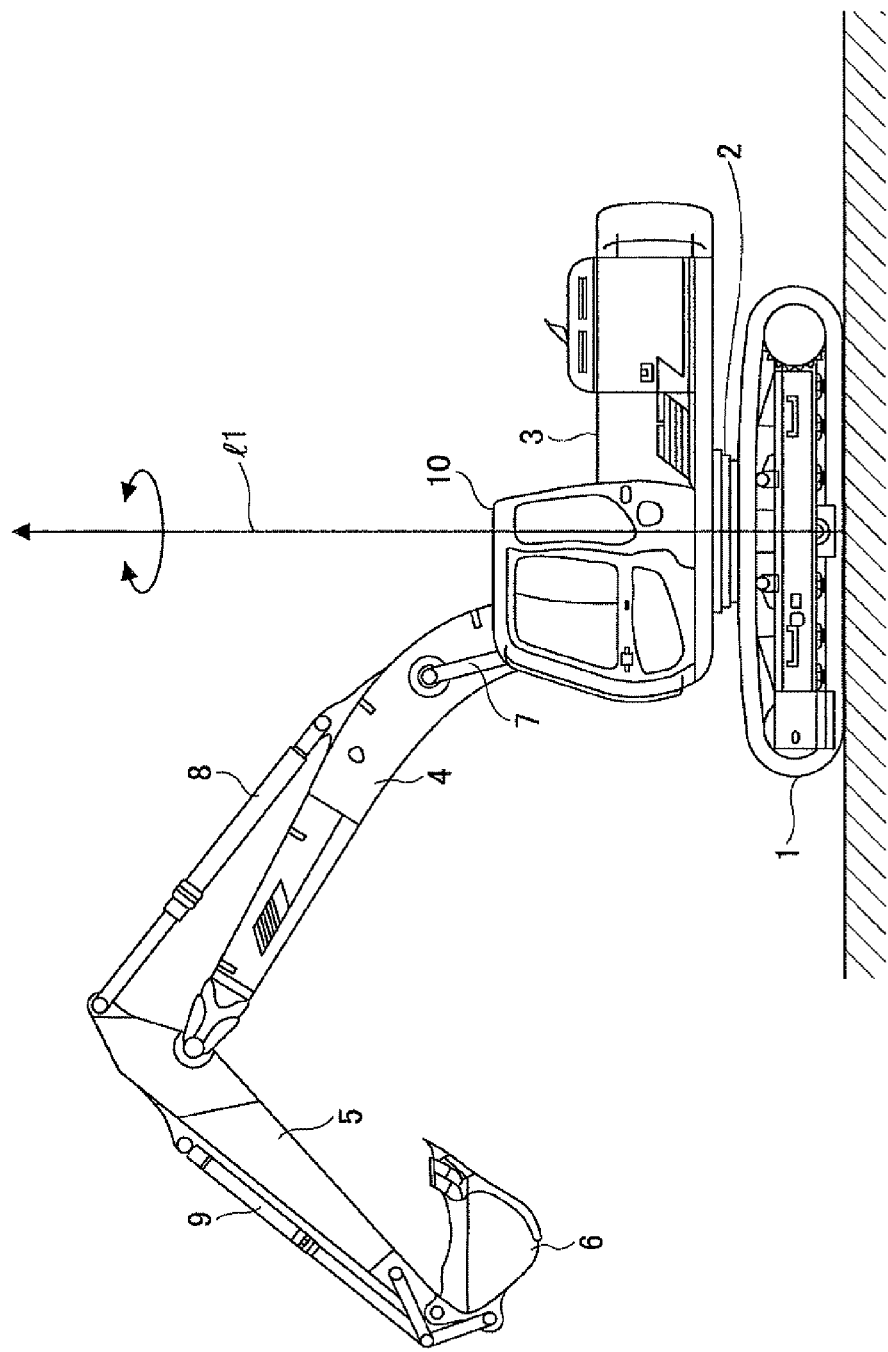
FIG. 1 is a side view showing a construction machine including a turning drive control apparatus according to the present embodiment.

EXPLANATION OF REFERENCE NUMBERS 1 lower-part moving body
1A, 18 hydraulic motor
2 turning mechanism
3 upper-part turning body
4 boom
5 arm
6 bucket
7 boom cylinder
8 arm cylinder
9 bucket cylinder
10 cabin
11 engine
12 motor generator
13 reduction gear
14 main pump
15 pilot pump
16 high-pressure hydraulic line
17 control valve
18 inverter
19 battery
20 inverter
21 turning electric motor
23 mechanical brake
24 turning reduction gear
25 pilot line
26 operation apparatus
26A, 26B lever
26C pedal
27 hydraulic line
28 hydraulic line
29 pressure sensor
30 controller
31 speed command conversion part
32 drive control apparatus
40 turning drive control apparatus
50 drive command creation part
51 subtractor
52 PI control part
53 torque limiting part
54 torque limiting part
55 subtractor
56 PI control part
58 turning motion detection part
60 drive command control part
61 correction zero speed command creation part
62 subtractor
63 PI control part
64, 66 relay
65, 67 torque current command correction part
68 adder
70 main control part

BEST MODE FOR CARRYING OUT THE INVENTION

A description will be given below of a turning drive control apparatus according to the present invention and a construction machine including the same.

FIG. 1 is a side view showing the construction machine containing the turning drive control apparatus according to the present embodiment.

An upper-part turning body 3 is mounted to a lower-part moving body 1 of the construction machine via a turning mechanism 2. Additionally, a cabin 10 and a power source are mounted to the upper-part turning body 3 in addition to a boom 4, an arm 5 and a bucket 6, and a boom cylinder 7, an arm cylinder 8 and a bucket cylinder 9 for hydraulically driving them. Here, as illustrated in FIG. 1, when the construction machine is on a flat ground, the turning axis of the turning mechanism 2 extends in the same direction as the vertical axis 11.

Figure 2:
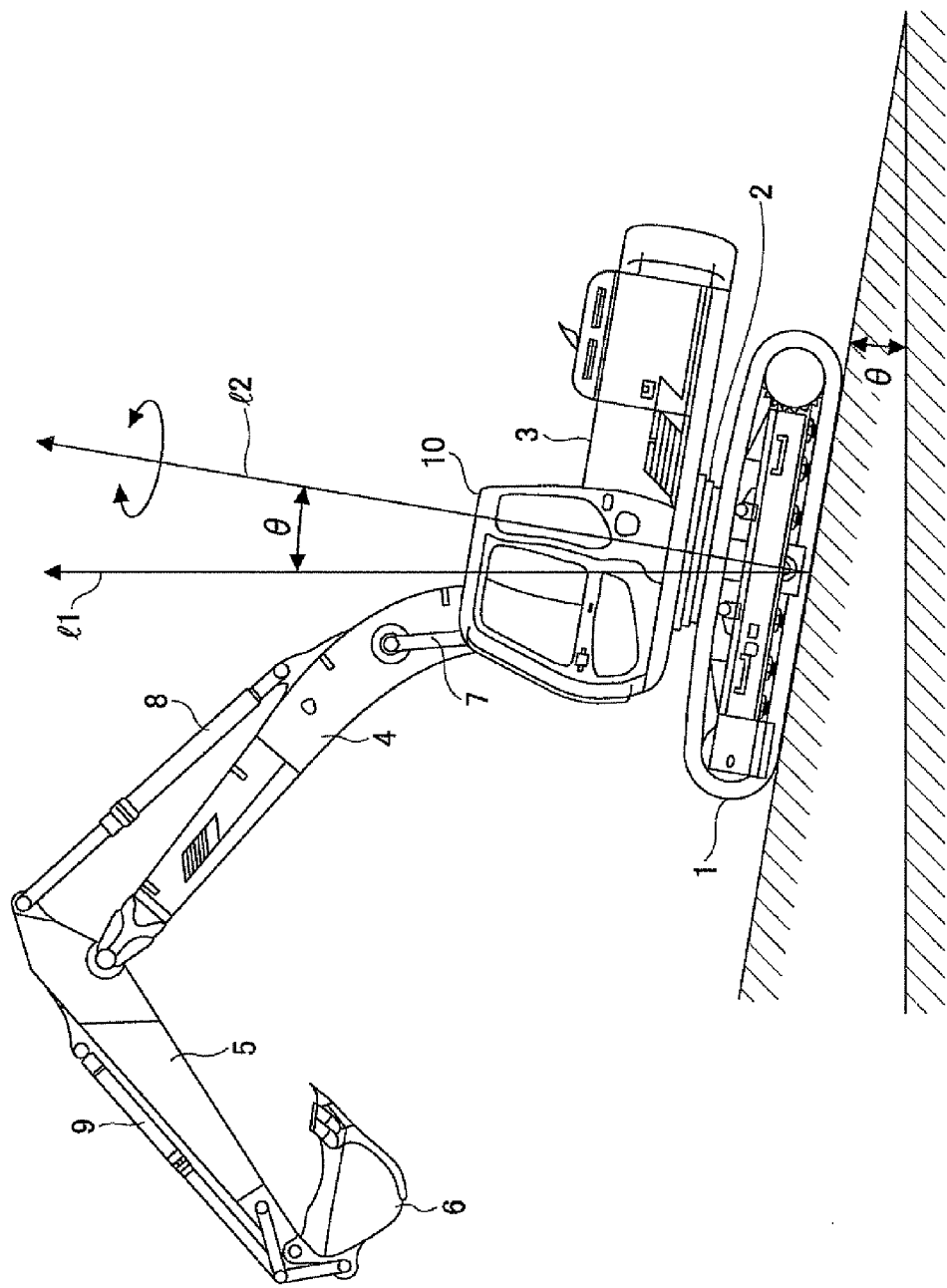
FIG. 2 is an illustration indicating a state where the construction machine illustrated in FIG. 1 is on a sloping ground having an inclination angle θ.

FIG. 2 is an illustration indicating a state where the construction machine illustrated in FIG. 1 is on a slope ground of a slope angle θ. On the sloping ground, the turning axis 12 of the turning mechanism 2 inclines relative to the vertical axis 11 by the angle θ. Thus, as already explained as an issue, different from a case where it is on a flat ground, if a drive torque is insufficient and an operator controls to turning the upper-part turning body 3, it may turn in a direction opposite to a direction in which an operator operates to turn it.

"Entire Structure"

Figure 3:
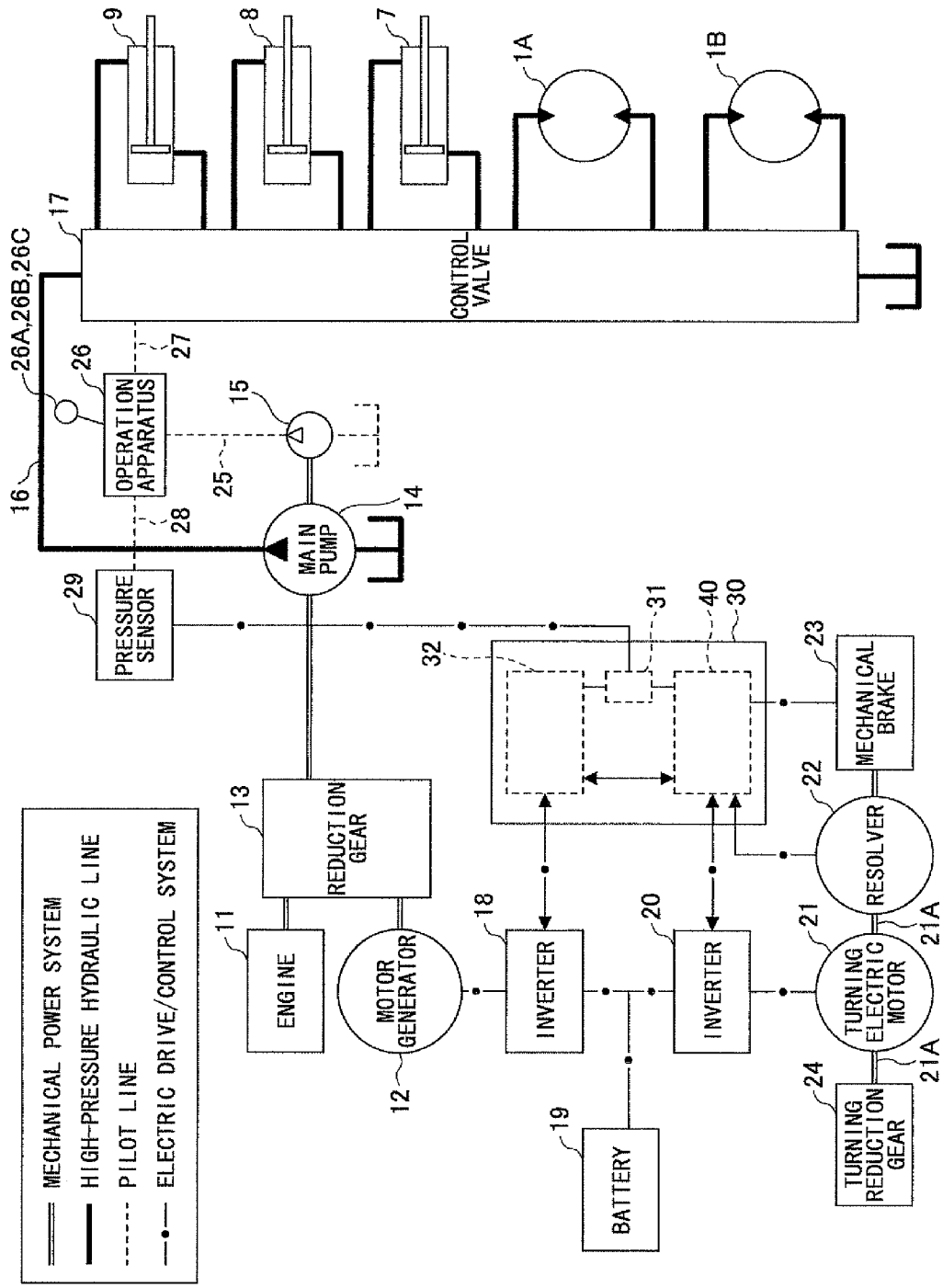
FIG. 3 is a block diagram representing the construction machine including the turning drive control apparatus according to the present embodiment.

FIG. 3 is a block diagram showing a structure of the construction machine including the turning drive control apparatus according to the present embodiment. In FIG. 3, a mechanical power system is indicated by double lines, high-pressure hydraulic lines by solid lines, pilot lines by dashed lines, and an electric drive/control system by single-dashed chain lines.

Both an engine 11 as a mechanical drive part and a motor generator 12 as an assist drive part are connected to an input shaft of a reduction gear 13 as a power-up machine. A main pump 14 and a pilot pump 15 are connected to an output shaft of the reduction gear 13. A control valve 17 is connected to the main pump 14 through a high-pressure hydraulic line 16.

The control valve 17 is a control device, which controls a hydraulic system in the construction machine of the present embodiment, and hydraulic motors 1A (right) and 1B (left) for the lower-part moving body 1, a boom cylinder 7, an arm cylinder 8, and a bucket cylinder 9 are connected to the control valve 17 through high-pressure hydraulic lines.

Moreover, a battery 19 as an electric storage device is connected to the motor generator 12 through an inverter 18, and a turning electric motor 21 is connected to the battery 19 through an inverter 20.

A resolver 22, a mechanical brake 23, and a turning reduction gear 24 are connected to a rotation shaft 21A of the turning electric motor 21. Moreover, an operation apparatus 26 is connected to the pilot pump 15 through a pilot line 25.

The control valve 17 and a pressure sensor 29 as a lever operation detection part are connected to the operation apparatus 26 through hydraulic lines 27 and 28, respectively. A controller 30, which performs a drive control of an electric system of the construction machine of the present embodiment, is connected to the pressure sensor 29.

The construction machine of the present embodiment mentioned above is a hybrid type construction machine using the engine 11, the motor generator 12, and the turning electric motor 21 as power sources. Those power sources are mounted on the upper-part turning body 3 illustrated in FIG. 1. Hereafter, each part is explained.

"Structure of Each Part"

The engine 11 is, for example, an internal combustion engine constituted by a diesel engine, and an output shaft thereof is connected to one input axis of the reduction gear 13. The engine 11 is always operated during operation of the construction machine.

The motor generator 12 can be an electric motor, which is capable of performing both a motor (assist) operation and a generator operation. Here, a motor generator AC-driven by the inverter 20 is indicated as the motor generator 12. The motor generator 12 can be constituted by, for example, an IPM (Interior Permanent Magnetic) motor having magnets embedded inside a rotor. A rotation shaft of the motor generator 12 is connected to the other input shaft of the reduction gear 13.

The reduction gear 13 has two input shafts and one output shaft. A drive shaft of the engine 11 and a drive shaft of the motor generator 12 are connected to the two input shafts, respectively. Moreover, a drive shaft of the main pump 14 is connected to the output shaft. If a load of the engine 11 is large, the motor generator 12 performs an electric motor (assist) operation, and a drive force of the motor generator 12 is transmitted to the main pump 14 through the output shaft of the reduction gear 13. Thereby, the drive of the engine 11 is assisted. On the other hand, if the load of engine 11 is small, the motor generator 12 performs a generation by a generation operation by a driver force of the engine 11 being transmitted to the motor generator 12 through the reduction gear 13. A change between the electric motor operation and the generator operation of the motor generator 12 is performed by the controller 30 in response to the load of the engine 11.

The main pump 14 is a pump, which generates a hydraulic pressure to be supplied to the control valve 17.

The hydraulic pressure is supplied through the control valve 17 in order to drive the hydraulic motors 1A and 1B, the boom cylinder 7, the arm cylinder 8, and the bucket cylinder 9.

The pilot pump 15 is a pump for generating a pilot pressure necessary for the hydraulic operation system. A structure of the hydraulic operation system will be explained later.

The control valve 17 is a hydraulic control device, which performs a hydraulic drive control of these by controlling the hydraulic pressure to be supplied to each of the hydraulic motors 1A and 1B for the lower-part moving body 1, the boom cylinder 7, the atm cylinder 8, and the bucket cylinder 9, which are connected through high-pressure hydraulic lines, according to an operation input of the operator.

The inverter 18 is provided between the motor generator 12 and the battery 19 to perform an operation control of the motor generator 12 based on a command from the controller 30. Thereby, when the inverter 18 is carrying out an electric motor operation of the motor generator 12, a required electric power is supplied to the motor generator 12 from the battery 19. Moreover, when carrying out a generation operation of the motor generator 12, the electric power generated by the motor generator 12 is charged to the battery 19.

The battery 19 is provided between the inverter 18 and the inverter 20. Thereby, the battery 19 is a power source that, when at least one of the motor generator 12 and the turning electric motor 21 is performing an electric motor operation or a power running operation, supplies an electric power required by the electric motor operation or the power running operation, and, when at least one of them is performing a generation operation or a regenerative operation, accumulates the regenerative electric power as electric energy.

The inverter 20 is provided between the turning electric motor 21 and the battery 19 in order to perform an operation control to the turning electric motor 21 based on a command from the controller 30. Thereby, when the inverter causes the turning electric motor 21 to perform a power running operation, a necessary electric power is supplied from the battery 19 to the turning electric motor 21. Moreover, when the turning electric motor 21 is carrying out a regenerative operation, an electric power generated by the turning electric motor 21 is charged to the battery 19.

The turning electric motor 21 is an electric motor capable of performing both a power running operation and a regenerative operation, and is provided for driving the turning mechanism 2 of the upper-part turning body 3. In the case of power running operation, a rotating force of the rotation drive power of the turning electric motor 21 is amplified by the reduction gear 24, and the upper-part turning body 3 is subjected to an acceleration or deceleration control to perform a rotating operation. Moreover, a number of revolutions is increased by the reduction gear 24 by an inertia rotation of the upper-part turning body 3 and is transmitted to the turning electric motor 21, which causes generation of a regenerative electric power. Here, an electric motor, which is AC-driven by the inverter 20 according to a PWM (Pulse Width Modulation) control signal, is indicated as the turning electric motor 21. The turning electric motor 21 can be constituted by, for example, an IPM motor of a magnet embedded type. Thereby, an electric power generated by the turning electric motor 21 can be increased during regeneration because a larger electromotive power can be generated.

It should be noted that the charge and discharge control of the battery 19 is performed by the controller 30 based on a charge state of the battery 19, an operation state of the motor generator 12 (electric motor operation or generation operation), and an operation state of the turning electric motor 21 (power running operation or regenerative operation).

The resolver 22 is a sensor, which detects a rotation position and a rotation angle of a rotation shaft 21A of the turning electric motor 21, and is configured to detect a rotation angle and the rotation direction of the rotation shaft 21 by detecting a difference between the rotation position of the rotation shaft 21A before rotation of the turning electric motor 21 and a rotation position after leftward rotation or rightward rotation by being mechanically coupled to the turning electric motor 21. A rotation angle and a rotation direction of the turning mechanism 2 can be derived by detecting the rotation angle of the rotation shaft 21A of the turning electric power 21.

The mechanical brake 23 is a brake apparatus, which generates a mechanical brake force, to mechanically stop the rotation shaft 21A of the turning electric motor 21. The brake/release of the mechanical brake 23 is switched by an electromagnetic switch. The switching is performed by the controller 30.

The turning reduction gear 24 is a reduction gear, which reduces the rotation speed of the rotation shaft 21A of the turning electric motor 21 and transmits to the turning mechanism 2. Thereby, when a power running operation is performed, the rotation force of the turning electric motor 21 is amplified so that a larger rotation force can be transmitted to the turning body. On the contrary, when a regenerative operation is performed, the turning electric power 21 is caused to generate a larger number of revolutions.

The turning mechanism 2 is operable in a state where the mechanical brake 23 of the turning electric motor 21 is released, and, thereby, the upper-part turning body 3 is rotated in a counter-clockwise direction or a clockwise direction.

The operation apparatus 26 is an operation apparatus for operating the turning electric motor 21, the lower-part moving body 1, the boom 4, the arm 5, and the bucket 6, and includes levers 26A and 26B and a pedal 26C. The lever 26A is a lever for operating the turning electric motor 21 and the arm 5, and is provided near an operator's seat of the upper-part turning body 3. The lever 26B is a lever for operating the boom 4 and the bucket 6, and is provided near an operator's seat of the upper-part turning body 3. Additionally, the pedal 26C is a pair of pedals for operating the lower-part moving body, and is provided under the operator's seat.

The operation apparatus 26 changes a hydraulic pressure (primary side hydraulic pressure) supplied through a pilot line 25 into a hydraulic pressure (secondary side hydraulic pressure) corresponding to an operation amount of an operator, and outputs it. The secondary side hydraulic pressure output from the operation apparatus 26 is supplied to the control valve 17 through a hydraulic line 27, and detected by the pressure sensor 29.

When each of the levers 26A and 26B and the pedal 26C is operated, the control valve 17 is driven through the hydraulic line 27, and, thereby, the hydraulic motors 1A and 1B, the boom cylinder 7, the arm cylinder 8, and the bucket cylinder 9 are controlled to drive the lower-part moving body 1, the boom 4, the arm 5, and the bucket 6.

It should be noted that because one line of the hydraulic line 27 is provided for driving each of the hydraulic motors 1A and 1B (total of two lines) and two lines of the hydraulic line 27 are provided for operating each of the boom cylinder 7, the arm cylinder 8, and the bucket cylinder, respectively (total of six lines), there are actually eight lines but these lines are represented by a single line for the sake of convenience of explanation.

The pressure sensor 29 as a lever operation detection part detects a change in the hydraulic pressure in the hydraulic line 28 due to an operation of the lever 26A. The pressure sensor 29 outputs an electric signal representing the hydraulic pressure in the hydraulic line 28. This electric signal is input to the controller 30. Thereby, an operation amount of the lever 26A can be accurately grasped. Although the pressure sensor as a lever operation detection part is used in the present embodiment, a sensor, which directly reads an operation amount of the lever 26A by an electric signal, may be used.

"Controller 30"

The controller 30 is a control device, which performs a drive control of the construction machine of the present embodiment, and includes a speed command conversion part 31, a drive control device 32, and a turning drive control device 40. The controller 30 consists of an operation processing device containing a CPU (Central Processing Unit) and an internal memory, and the speed command conversion part 31, the drive control device 32, and the turning drive control device 40 are devices, which are realized by the CPU of the controller 30 performing a program for drive control stored in the internal memory.

The speed command conversion part 31 is an operation processing part, which changes a signal input from the pressure sensor 29 into a speed command. Thereby, an amount of operation of the lever 26A is changed into a speed command (rad/s) to cause the turning electric motor 21 to be rotationally driven. The speed command is input to the drive control device 32 and the turning drive control device 40. The conversion characteristic used in the speed command conversion part 31 will be explained with reference to FIG. 4.

Here, in the specification and claims, a direction in which an operator causes the upper-part turning body 3 to turn by operating the lever 26A of the operation apparatus 26 from a neutral position (that is, a turning direction input to the operation apparatus 26) is referred to as "turning operation direction".

The drive control device 32 is a control device for performing an operation control (changing between an electric motor operation and an electric power generating operation) of the motor generator 12, and a charge/discharge control of the battery 19. The drive control device 32 changes the operation of the motor generator 12 between the electric motor operation and the electric power generating operation in response to a state of a load of the engine 11 and a state of charge of the battery 19. The drive control device 32 performs the charge/discharge control of the battery 19 via the inverter 18 by changing the operation of the motor generator 12 between the electric motor operation and the electric power generating operation.

"Conversion Characteristic of Operation Amount/Speed Command"

Figure 4:
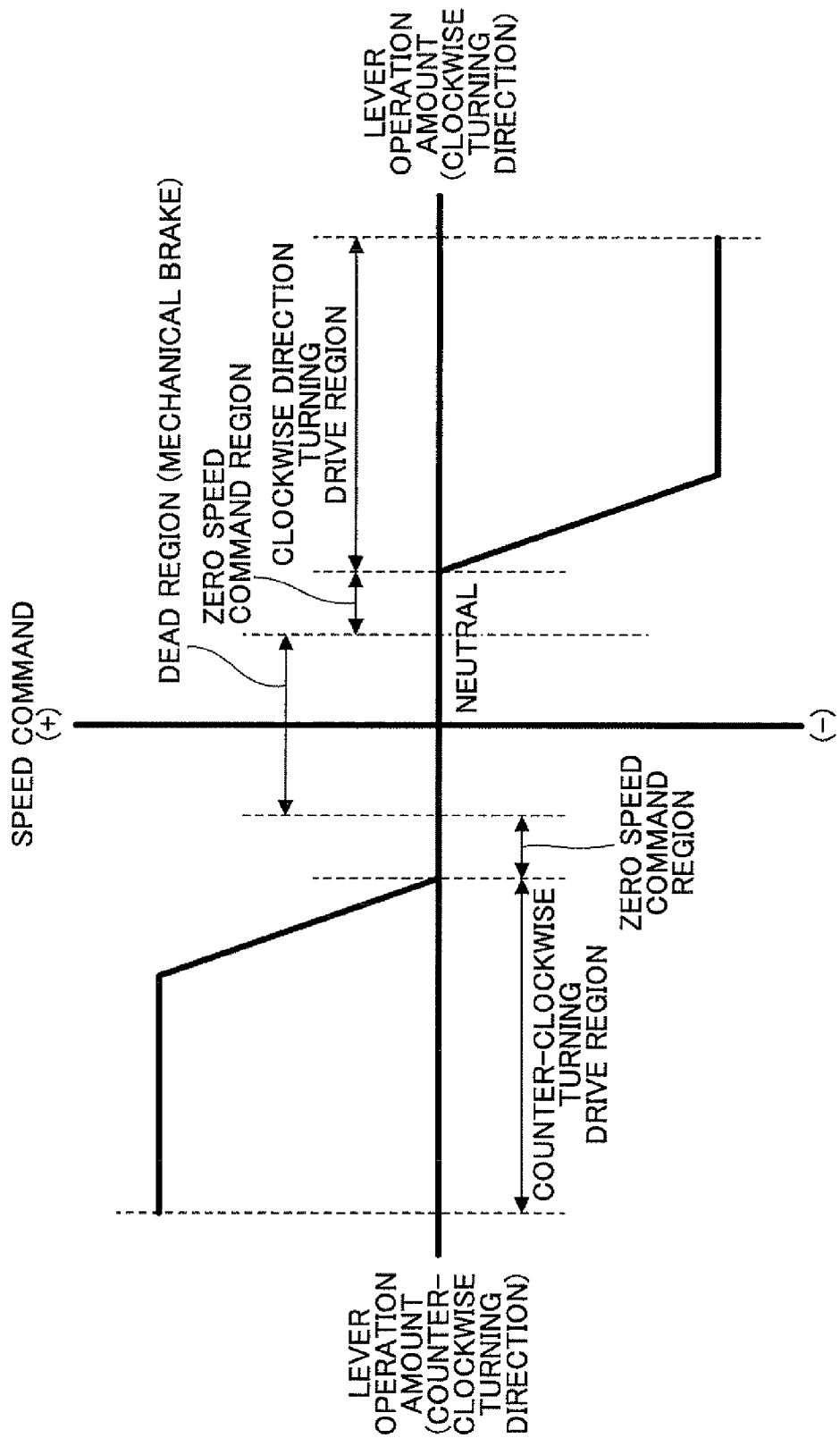
FIG. 4 is a chart indicating a conversion characteristic for converting an operation amount of an operation lever into a speed command in a speed command conversion part of the construction machine according to the present embodiment.

FIG. 4 is an illustration indicating a conversion characteristic of converting an amount of operation of the operation lever 26A into a speed command (a speed command for causing the turning electric motor 21 to rotate to cause the upper-part turning body 3 to turn) in the speed command conversion part 31 of the construction machine according to the present embodiment. The conversion characteristic is divided into five regions in response to an amount of operation of the operation lever 26A, the five regions being a dead region, zero speed command regions (for counter-clockwise turning and clockwise turning), a counter-clockwise turning drive region, and a clockwise turning drive region.

In the control system of the construction machine according to the present embodiment, values indicating the counter-clockwise direction are expressed by positive values and values indicating the clockwise direction are expressed by negative values. Thus, a value of the speed command for causing the upper-part turning body 3 to turn in the counter-clockwise direction is positive, and a value of the speed command for causing the upper-part turning body 3 to turn in the clockwise direction is negative.

"Dead Region"

As indicated by the conversion characteristic, the dead region is provided in the vicinity of the neutral position of the lever 26A. In this dead region, the speed command is not output from the speed command conversion part 31, and the drive control of the turning electric motor 21 by the turning drive control device 40 is not performed. Moreover, in the dead region, the turning electric motor 21 is set in a state where it is mechanically stopped by the mechanical brake 23.

Therefore, while an amount of operation of the lever 26A is in the dead region, the turning electric motor 21 is mechanically stopped by the mechanical brake 23, and, thereby, the upper-body 3 is set in a state where it is mechanically stopped.

"Zero Speed Command Region"

The zero speed command region is provided on both outsides of the dead region in the direction of operation of the lever 26A. The zero speed command region is a buffer region, which is provided to improve operability when changing between the stopped state of the upper-part turning body 3 and the turning state in the turning drive regions in counter-clockwise and clockwise directions.

When an amount of operation of the operation lever 26A is within the range of the zero speed command regions, a zero speed command is output from the speed command conversion part 31, and the mechanical brake 23 is set in a released state.

Here, the zero speed command is a speed command for causing the rotating speed of the rotation shaft 21A of the turning electric motor 21 to be zero in order to cause the turning speed of the upper-part turning body 3 to be zero, and is used as a target value to set the rotating speed of the rotation shaft 21A to be close to zero in a PI (Proportional Integral) control mentioned later.

It should be noted that the change between brake (ON) and release (OFF) of the mechanical brake 23 is performed by the turning drive control device 40 in the controller 30 on the boundary between the dead region and the zero speed command region.

Therefore, on a flat ground, the mechanical brake 23 is released while an amount of operation of the lever 26A is in the zero speed command region so that the rotating shaft 21A of the turning electric motor 21 is maintained in the stopped state by the zero speed command. Thereby, on a flat ground, the upper-part turning body 3 is maintained in the stopped state without being driven to turn.

"Counter-Clockwise Direction Turning Drive Region"

The counter-clockwise direction turning drive region is a region in which a speed command for causing the upper-part turning body 3 to turn in the counter-clockwise direction is output from the speed command conversion part 31.

In this region, it is set that an absolute value of the speed command increases in response to an amount of operation of the lever 26A. Specifically, in FIG. 3, the speed command increases in a direction of (+). On a flat ground, a drive command is computed by the turning drive control device 40 based on the speed command, and the turning electric motor 21 is driven according to the drive command, which results in the upper-part turning body 3 being driven to turn in the counter-clockwise direction. It should be noted that the absolute value of the speed command in FIG. 4 is a fixed value when an amount of operation of the lever 26A exceeds a fixed range, and this indicates that the absolute value of the speed command is limited in order to limit the turning speed to be equal to or smaller than a previously set value.

It should be noted that in order to limit the turning speed of the upper-part turning body 3 to be equal to or smaller than a previously set value, the absolute value of the speed command value in the counter-clockwise direction turning drive region is limited by a predetermined value.

"Clockwise Direction Turning Drive Region"

The clockwise direction turning drive region is a region in which a speed command for causing the upper-part turning body 3 to turn in the clockwise direction is output from the speed command conversion part 31.

In this region, it is set that an absolute value of the speed command increases in response to an amount of operation of the lever 26A. Specifically, in FIG. 3, the speed command increases in a direction of (−). On a flat ground, a drive command is computed by the turning drive control device 40 based on the speed command, and the turning electric motor 21 is driven according to the drive command, which results in the upper-part turning body 3 being driven to turn in the clockwise direction.

It should be noted that, similar to the counter-clockwise direction turning region, the absolute value of the speed command in the clockwise direction turning region is limited by a predetermined value.

"Turning Drive Control Device 40"

Figure 5:
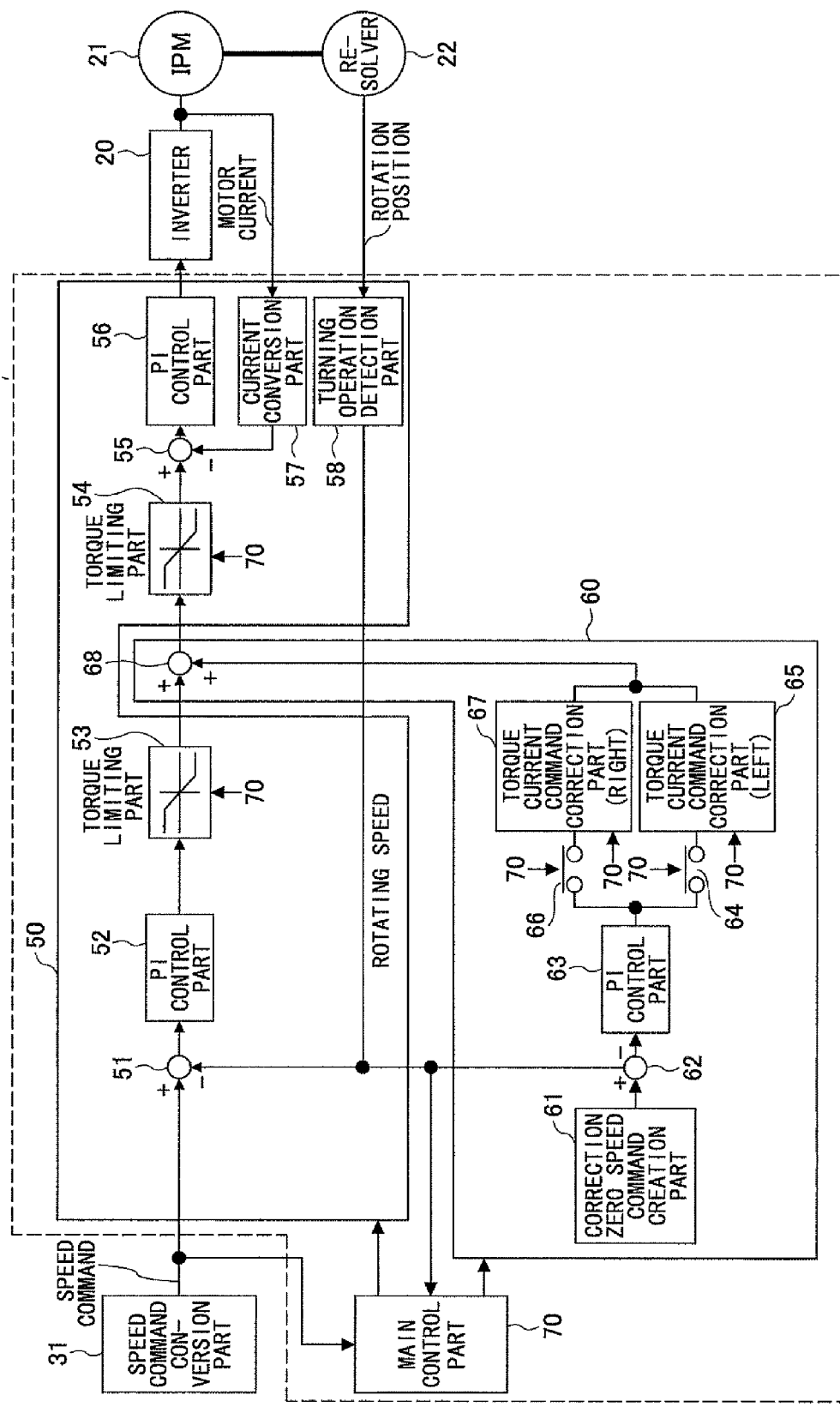
FIG. 5 is a control block diagram representing a structure of the turning drive control apparatus according to the present embodiment.

FIG. 5 is a control block diagram showing a structure of the turning drive control device 40 of the present embodiment.

The turning drive control device 40 is a control device for performing a drive control of the turning electric motor 21 through the inverter 20, and includes a drive command creation part, which creates a drive command for driving the turning electric motor 21, a drive command correction part 60, which corrects the drive command, and a control part 70.

A speed command output from the speed command conversion part 31 in response to an amount of operation of the lever 26A is input to the drive command creation part 50, and the drive command creation part 50 creates a drive command based on the speed command. The drive command output from the drive command creation part 50 is input to the inverter 20 so that the turning electric motor 21 is AC-driven by the inverter 20 according to a PWM control signal.

The drive command correction part 60 corrects the drive command for driving the turning electric motor 21 in a case where the turning operation direction designated by an operator is different from the turning direction of the upper-body turning body 3 when performing a drive control of the turning electric motor 21.

The control part 70 is a control part, which performs peripheral processing necessary for the control process of the turning drive control device 40. Specific contents of the process will be explained in each case.

"Drive Command Creation Part 50"

The drive command creation part 50 includes a subtractor 51, a PI control part 52, a torque limiting part 53, a torque limiting part 54, a subtractor 55, a PI control part 56, a current conversion part 57, and a turning motion detection part 58. A speed command (rad/s) for the turning drive in response to an amount of operation of the lever 26A is input to the subtractor 51 of the drive command creation part 50.

The subtractor 51 subtracts a rotating speed (rad/s) of the turning electric motor 21 detected by the turning motion detection part 58 from a value of a speed command (hereinafter, referred to as speed command value) corresponding to an amount of operation of the lever 26A, and output the difference. The difference is used in the PI control part 52 mentioned later to set the rotating speed of the turning electric motor 21 to be close to the speed command value (target value).

Based on the difference input from the subtractor 51, the PI control part 52 performs a PI control so that the rotating speed of the turning electric motor 21 is close to the speed command (target value) (that is, to decrease the difference), and computes a necessary torque current command. The created torque current command is input to the torque limiting part 53.

The torque limiting part 53 performs a process of limiting a value of the torque current command (hereinafter, referred to as torque current command value) in response to an amount of operation of the lever 26A. This limiting process is performed based on the limitation characteristic, which limits the torque current command value to increase slowly in response to an amount of operation of the lever 26A. Because the controllability is deteriorated if the torque current command value computed by the PI control part 52 is increased rapidly, the limitation of the torque current command value is performed to suppress the deterioration.

This limitation characteristic has a characteristic to slowly increase the torque current command value in association with an increase in an amount of operation of the lever 26A, and has a characteristic to limit both in the counter-clockwise direction and the clockwise direction of the upper-part turning body 3. The data indicating the limitation characteristic is stored in the internal memory of the control part 70, and is read by the torque limiting part 53.

The torque limiting part 54 limits the torque current command value input from an adder 68 mentioned later so that a torque generated by the torque current command input from the adder 68 is equal to or smaller than an allowable maximum torque value of the turning electric motor 21. The limitation of the torque current command value is performed on turning of the upper-part turning body 3 in the counter-clockwise direction and the clockwise direction.

Here, the upper limit value (maximum value for counter-clockwise turning) and the lower limit value (minimum value for clockwise turning) for limiting the torque current command value in the torque limiting part 54 are set to values by which a drive torque to turn the boom 4, the arm 5 and the bucket 6 upward can be generated in a state where the boom 4, the arm 5 and the bucket 6 are extended and the inertia moment of the upper-part turning body 3 is large on a sloping ground even if the limitation of the torque current command value is performed by the torque limiting part 54. It should be noted that data indicating the characteristic to limit the torque current command value is stored in the internal memory of the control part 70 and is read by the torque limiting part 54.

The subtractor 55 outputs a difference acquired by subtracting an output value of a current conversion part 57 from the torque current command value input from the torque limiting part 54. This difference is used in a PI control for setting the drive torque of the turning electric motor output from the current conversion part 57 to be close to the torque represented by the torque current command value (target value) input though the torque limiting part 54 in a feedback loop containing a PI control part 56 and the current conversion part 57 mentioned later.

Based on the difference input from the subtractor 55, the PI control part 56 performs a PI control to decrease the difference to create a torque current command, which is a final drive command to be sent to the inverter 20. The inverter 20 PWM-drives the turning electric motor 21 based on the torque current command input from the PI control part 56.

The current conversion part 57 detects a motor current of the turning electric motor 21, changes this into a value corresponding to the torque current command, and inputs it to the subtractor 55.

The turning motion detection part 58 detects a change in a rotation position of the turning electric motor 21 detected by the resolver 22 (that is, a turning action of the upper-part turning body 3), and derives a rotating speed of the turning electric motor 21 from temporal changes in the rotation position according to a differential operation. The data representing the derived rotating speed is input to the subtractor 51 and the drive command correction part 60.

In the drive command creation part 50 of such a structure, a torque current command for driving the turning electric motor 21 is created based on the speed command input from the speed command conversion part 31, and, on a flat ground, the upper-part turning body 3 is turned to a desired position. Such a turning operation is realized by the same operation with an operation of a hydraulically-driven construction machine on a flat ground.

In the meantime, as mentioned above, in a case where the construction machine is on a sloping ground, it is possible that the upper-part turning body 3 turns if an inertial moment is large.

However, in the turning drive control device of the present embodiment, because the torque current command is corrected by the drive command correction part 60, such a turning motion in a direction opposite to a direction of a turning operation can be reduced. A description will be given below of the drive command correction part 60.

"Drive Command Correction Part 60"

The drive command correction part 60 is an operation processing part, which includes a zero speed command creation part 61 for correction, a subtractor 62, a PI control part 63, a relay 64, a torque current command correction part 65, relay 66, a torque current command correction part 67, and an adder 68, and which, in a case where a turning in a direction opposite to the turning operation direction input to the operation device 26 is generated, corrects a torque current command for driving the turning electric motor 21 in order to reduce it.

The zero speed command creation part 61 for correction outputs a zero speed command (rad/s) for correction. The zero speed command for correction is a speed command for creating a torque current command for correction (hereinafter, referred to as correction torque current command) to correct the torque current command when the torque current command computed in the drive command creation part 50 is insufficient. The zero speed command creation part 61 for correction always outputs the zero speed command for correction, while an amount of operation of the lever 26A is in the zero speed command region, the counter-clockwise direction turning drive region, and the clockwise direction turning drive region.

The subtractor 62 subtracts a value of rotation speed (hereinafter, referred to as rotation speed value) from a value of the zero speed command for correction (hereinafter, referred to as correction zero speed command value) input from the zero speed command creation part 61 for correction. The difference acquired by the subtraction is input to the PI control part 63.

The PI control part 63 performs a PI control in order to decrease the difference based on the difference input from the subtractor 62 (that is, to set the rotation speed to be close to zero with the correction zero speed command value input from the correction zero speed command creation part 61 set as a target value) in order to create the correction torque current value for correcting the torque current command value created by the drive command creation part 50.

Here, a control gain of the PI control part 63 is set to be larger than a control gain of the PI control part 52. Because the PI control part 52 is contained in the drive command creation part 50, which creates the torque current command value for driving the turning electric motor 21, if the control gain (a proportional gain and/or an integration gain) is set excessively large, it may be a cause of an overshoot, which is not preferable.

However, because the PI control part 63 computes the correction torque current command value for sending to the drive command creation part 50, it hardly becomes a cause of an overshoot even if the control gain (a proportional gain and/or an integration gain) is increased, which can suppress a turning action in a reverse direction rapidly. For this reason, the proportional gain of the PI control part 63 may be set to be about four times that of the PI control part 52, and the integration gain may be set to be about ten times that of the PI control part.

The relay 64 is closed when a counter-clockwise turn is designated by the operation lever 26A, and thereby, the torque current command correction part 65 is selected. The open/close control of the relay 64 is performed by the control part 70.

Figure 6:
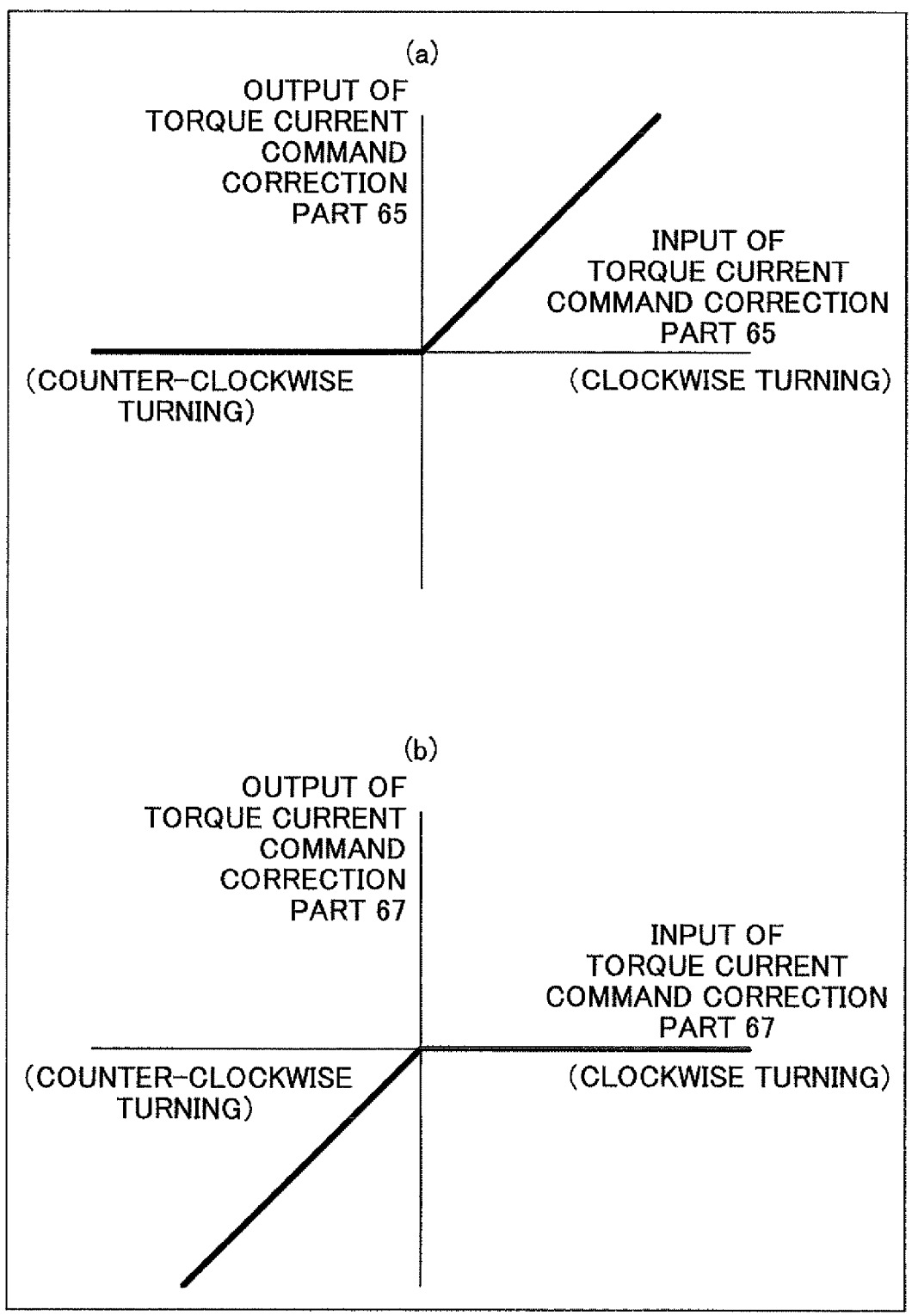
FIG. 6 is an illustration indicating input/output characteristics of torque current command correcting parts in the turning drive control apparatus according to the present embodiment, wherein (a) represents a correction characteristic for counter-clockwise turning and (b) represents a correction characteristic for clockwise turning.

The torque current command correction part 65 performs a correction process to correct the correction torque current command value sent from the PI control part 63, if needed, based on the consistency between the turning operation direction (counter-clockwise direction) and the turning direction of the upper-part turning body 3. The characteristic shown in FIG. 6 is used in this correction process. In addition, the rotating direction of the upper-part turning body 3 is obtained from the rotating direction of the turning electric motor 21.

FIG. 6 is a chart showing input/output characteristics of the torque current command correction parts 65 and 67 in the turning drive control device according to the present embodiment, wherein (a) represents a correction characteristic for counter-clockwise turning and (b) represents a correction characteristic for clockwise turning.

Here, horizontal axes of FIG. 6(a) and (b) represent values of the correction torque current command input to the torque current command correction parts 65 and 67 through the relays 64 and 66 from the PI control part 63. Because the input values (correction torque current command values) are computed by the PI control part 63 based on the difference obtained in the subtractor 62 by subtracting the rotating speed value from the correction zero speed command value, the input values take negative values when the upper-part turning body 3 is turning in the counter-clockwise direction.

Similarly, the input values of the torque current command correction parts 65 and 67 take positive values, when the upper-part turning body 3 is turning in the clockwise direction. This is because the rotating speed representing the clockwise turning is a negative value, but it becomes a positive value by being subtracted from the correction zero speed command value in the subtractor 62 and the sign is inverted, and, further, the correction torque current command value taking a positive value is created in the PI control part 63 in order to generate a drive torque in the counter-clockwise direction.

For this reason, in FIG. 6(a) and (b), the case where the horizontal axis representing the input value of the torque current command correction parts 65 and 67 is negative corresponds to a turning of the upper-part turning body 3 in the counter-clockwise direction, and the case where the horizontal axis is positive corresponds to a turning of the upper-part turning body 3 in the clockwise direction.

Moreover, the vertical axes of FIG. 6(a) and (b) represent the correction torque current command values after correction output from the torque current command correction parts 65 and 67, and, similar to FIG. 4, the correction torque current command value for turning the upper-part turning body 3 in the counter-clockwise direction is represented by a positive value, and the correction torque current command value for turning the upper-part turning body 3 in the clockwise direction is represented by a negative value.

In addition, data representing the characteristics of FIG. 6(a) and (b) are stored in the internal memory of the control part 70, and are read by the torque current command correction parts 65 and 67.

As illustrated in FIG. 6(a), the correction characteristic for a counter-clockwise turn has a characteristic in that an output value is zero when the upper-part turning body 3 is turning in the counter-clockwise direction (in the area on the left side of the vertical axis of the correction characteristic). Additionally, when the upper-part turning body 3 is turning in the clockwise direction (in an area on the right side of the vertical axis of the correction characteristic), it has a characteristic in which a ratio of input/output values (output value/input value) is "1".

When a turning operation in the counter-clockwise direction is being performed by the lever 26A and the upper-part turning body 3 is turning in the counter-clockwise direction, the torque current command created in the drive command creation part 50 is sufficient, and the correction torque current command value is not needed.

For this reason, the input/output characteristic used in the torque current command correction part 65 is a characteristic, which sets the correction torque current command value input from the PI control part 63 to zero when the input value is a negative value, as illustrated in FIG. 6(a). The torque current command correction part 65 uses this characteristic to correct the correction torque current command computed by the PI control part 63 to be zero if the turning operation direction (counter-clockwise turning) and the turning direction of the upper-part turning body 3 are coincident with each other.

On the other hand, when a turning operation in the counter-clockwise direction is being performed by the lever 26A and the upper-part turning body 3 is reversely turning in the clockwise direction, because the torque current command alone is insufficient, the correction torque current command computed by the PI control part 63 is needed to be sent to the drive command creation part 50.

For this reason, the input/output characteristic used in the torque current command correction part 65 is a characteristic, which sets the ratio of an input value to an output value (output value/input value) to "1", when the input value is a positive value, in order to output the correction torque current command value, as illustrated in FIG. 6(a). Thereby, a correction torque current command value equal to the correction torque current command value input from the PI control part 63 is output from the torque current command correction part 65. It should be noted that although the case where the input-output ratio is "1" will be explained here, the input/output ratio may be a value which can be set arbitrarily in response to a gain or the like in the control system if it is a value other than zero "0".

The torque current command correction part 65 uses this characteristic to send a correction torque current command value equal to the correction torque current command value input from the PI control part 63 to the adder 68 of the drive command creation part 50.

It should be noted that a determination as to whether the turning operation direction and the rotating direction of the turning electric motor 21 are coincident with each other is performed by the control part 70.

The relay 66 is closed when a clockwise turning is designated by the operation lever 26A, and, thereby, the torque current command correction part 67 is selected. The open/close control of the relay 66 is performed by the control part 70.

The torque current command correction part 67 performs a correction process to correct the correction torque current command value sent from the PI control part 63, if needed, based on the consistency between the turning operation direction (clockwise direction) and the turning direction of the upper-part turning body 3. The characteristic shown in FIG. 6(b) is used in this correction process. In addition, the turning direction of the upper-part turning body 3 is obtained from a detection value of the resolver 22.

As illustrated in FIG. 6(b), the correction characteristic for a clockwise turn has a characteristic that when the upper-part turning body 3 is turning in the clockwise direction (in the area on the left side of the vertical axis of the correction characteristic), a ratio of input/output value (output value/input value) is set to "1". Additionally, when the upper-part turning body 3 is turning in the clockwise direction (in an area on the right side of the vertical axis of the correction characteristic), it has a characteristic in which the output value is zero.

The contents of the correction process are basically the same as the torque current command correction part 65 except that the counter-clockwise and clockwise directions are different. When the turning operation direction (clockwise turning) and the turning direction of the upper-part turning body 3 are coincident with each other, the torque current command created in the drive command creation part 50 is sufficient, and the correction torque current command value is not needed, and, thus, the torque current command correction part 67 corrects the correction torque current command computed by the PI control part 63 to zero.

For this reason, the input/output characteristic used in the torque current command correction part 67 includes a characteristic which sets the correction torque current command value input from the PI control part 63 to zero when the input value is a positive value, as illustrated in FIG. 6(*b*).

On the other hand, when the turning operation direction (clockwise direction) and the turning direction of the upper-part turning body 3 are different from each other, the torque current command created in the drive command creation part 50 is insufficient, and, thus, the correction torque current command computed by the PI control part 63 is needed to be sent to the drive command creation part 50.

For this reason, the input/output characteristic used in the torque current command correction part 67 has a characteristic which sets the ratio of an input value to an output value (output value/input value) to "1" when the input value is a negative value, in order to output the correction torque current command value, as illustrated in FIG. 6(*b*). Thereby, a correction torque current command value equal to the correction torque current command value input from the PI control part 63 is output from the torque current command correction part 67. It should be noted that although the case where the input-output ratio is "1" will be explained here, the input/output ratio may be a value which can be set arbitrarily in response to a gain or the like in the control system if it is a value other than zero "0".

The torque current command correction part 67 uses this characteristic to send a correction torque current command value equal to the correction torque current command value input from the PI control part 63 to the adder 68 of the drive command creation part 50.

It should be noted that a determination as to whether the turning operation direction and the rotating direction of the turning electric motor 21 are coincident with each other is performed by the control part 70.

The adder 68 adds the torque current command value sent from the torque limiting part 53 to the correction torque current command value input from the torque current command correction part 65 or the torque current command correction part 67 when the turning operation direction is different from the turning direction of the upper-part turning body 3. The torque current command created by the drive command creation part 50 is corrected according to the adding process.

It should be noted that the relays 64 and 66 are relays, which are closed by designation of the turning direction by the lever 26A, and are open when the turning direction is not designated.

"Turning Operation in Case a Correction by the Drive Command Correction Part 60 is not Performed (Comparison Example)"

Here, for comparison, a description will be given of a turning operation when a correction by the drive command correction part 60 is not performed (that is, a turning action according to only the speed command according to the conversion characteristic of FIG. 4.).

On a flat ground, if the lever 26A is operated from a stopped state in a leftward direction, the mechanical brake 23 is released when it goes beyond the dead region and changed into zero speed command region, and the zero speed command output from the speed command conversion part 31 is input to the drive command creation part 50. When the zero speed command is input, even if data representing a difference in rotation speeds is output from the subtractor 51 because the rotation shaft 21A of the turning electric motor 21 rotates and data representing the rotation speed is output from the turning motion detection part 58, the turning electric motor 21 is drive-controlled so that the difference in the rotation speeds is set to zero, thereby maintaining the rotation shaft 21A in a stopped state.

If the lever 26A is operated further and the speed command characteristic goes beyond the zero speed command region and changed into the counter-clockwise turning drive region, the torque current command based on the speed command output from the speed command conversion part 31 is output from the drive command creation part 50. Thereby, a drive control with the speed command output from the speed command conversion part 31 as a target value is performed, which drives the rotation shaft 21A of the turning electrical motor 21A so that the upper-part turning body 3 turns in the counter-clockwise direction.

On the other hand, on a flat ground, if an amount of operation of the lever 26A is decreased in a state where the upper-part turning body 3 is turning in the counter-clockwise direction, and when the speed command characteristic is changed from the counter-clockwise turning drive area to the zero speed command area, the rotation shaft 21A of the turning electric motor 21 is maintained in a stopped state.

If an amount of operation of the lever 26A is decreased further and the speed command characteristic is changed from the zero speed command region into the dead region, the mechanical brake 23 is actuated and no drive command is output from the speed command conversion part 31 and the drive command creation part 50 does not perform the drive control. Thereby, the rotation shaft 21A of the turning electric motor 21 is set in a mechanically stopped state. Those series of operations are the same in a turning operation in the clockwise direction on a flat ground, and descriptions thereof will be omitted.

As mentioned above, on a flat ground, it is possible to perform a turning drive of the upper-part turning body 3 in response to the turning operation direction input by the operator using the lever 26A.

Moreover, on a sloping ground, turning can be performed in the same manner as the above-mentioned case on a flat ground, also in a case of turning the upper-part turning body 3 in a direction in which the boom 4, the arm 5 and the bucket 6 having a large weight move downward along the slope.

In the case of turning the upper-part turning body 3 in a direction in which the boom 4, the arm 5 and the bucket 6 having a large weight move downward along the slope, there is a case where a torque to turn the upper-part turning body 3 in a reverse direction due to an inertia moment is larger than a drive torque generated in the rotation shaft 21A of the turning electric motor 21 according to the speed command. In such a case, the upper-part turning body 3 may turn in a direction in which the boom 4, the arm 5 and the bucket 6 having a large weight move downward along the slope.

That is, on the sloping ground, there may be a case where the upper-part turning body 3 turns in a direction opposite to the turning operation direction when a turning operation in the counter-clockwise direction or the clockwise direction is performed by the lever 26A and an amount of operation is in the zero speed command region.

Moreover, there may be a case where the upper-part turning body 3 turns in a direction opposite to the turning operation direction even when the speed command characteristic is in the counter-clockwise direction turning region or the clockwise direction turning region. In such a case, the upper-part turning body 3 turns in a direction opposite to the turning operation direction (a direction in which the boom 4, the arm 5 and the bucket 6 move downward along the slope).

That is, on a sloping ground, there may be a case where the upper-part turning body 3 turns in a direction opposite to the turning operation direction even when a turning operation in the counter-clockwise direction or the clockwise direction is performed by the lever 26A and an amount of operation is in the counter-clockwise direction turning region or the clockwise direction turning region.

However, according to the construction machine including the turning drive control apparatus of the present embodiment, because a correction of the drive command is performed by the drive command correction part 60, the turn in a direction opposite to the turning operation direction can be suppressed and further a start of motion can be made smooth. Hereinafter, the principle is explained.

"Turning Operation in Case a Correction by the Drive Command Correction Part 60 is Performed"

Next, a description will be given of a turning operation of the construction machine including the turning drive control device of the present embodiment. When a correction by the drive command correction part 60 is performed, unlike the turning operation on a flat ground in which the correction explained for comparison is performed, turning in a direction opposite to the turning operation direction is suppressed as mentioned below.

Also on a sloping ground, when a turning operation is performed on a gentle slope which is not given an influence of an inertia force, the torque current command is computed based on the speed command characteristic in the counter-clockwise direction or the clockwise direction in response to an amount of operation of the lever 26A, similar to a flat ground. Additionally, if the slope is gentle, there is not a case where the drive torque of the turning electric motor 21 for turning the upper-part turning body 3 the same as a flat ground is insufficient, and, thus, turning in a direction opposite to the turning operation direction is not detected. Thus, the correction values output from the torque current command correction part 65 and the torque current command correction part 67 are zero, and a correction of the torque current value is not performed. Thereby, on a flat ground, a turning operation in response to the speed command characteristic illustrated in FIG. 4 is performed.

Similarly, also in a case were the upper-part turning body 3 is turned in a direction in which the boom 4, the arm 5 and the bucket 6 having a large weight move downward along a slope, there is not a case where the drive torque of the turning electric motor 21 for turning the upper-part turning body 3 the same as a flat ground is insufficient, and, thus, turning in a direction opposite to the turning operation direction is not detected, and a turn can be made in the same direction as the turning operation direction.

Next, a description will be given of an operation when turning the upper-part turning body 3, on a sloping ground, in an upward direction along the slope by turning the boom 4, the arm 5 and the bucket 6 having a large weight in the counter-clockwise direction.

If counter-clockwise turning is designated by an operation of the lever 26A by an operator, an amount of operation of the lever 26A enters the zero speed command region illustrated in FIG. 4 and the mechanical brake 23 is released. In this state, if clockwise direction turning (reverse direction) is detected by the turning motion detection part 58, a difference in rotation speeds (a positive value) is output from the subtractor 62, and a correction torque current command value is computed by the PI control part 63 based on the difference. This correction torque current command value is input to the torque current command correction part 65, and a correction torque current command value having the same value as the input value is output from the torque current command correction part 65 and added in the adder 68 to a torque current command value (having a positive value for clockwise turning) output from the torque limiting part 53.

Here, when the upper-body turning body 3 starts to move in the clockwise direction due to an inertia force thereof, the difference output from the subtractor 62 increases. Thus, the output value output from the torque current command correction part 65 increases when the upper body turning body 3 starts to move in the clockwise direction (reverse direction), and also the torque current command value output from the torque limiting part 53 increases (FIG. 6(*a*)). Then, when the drive torque of the turning electric motor 21 increases, a force to turn the upper-part turning body 3 in the counter-clockwise direction (normal direction) increases, and, thereby, the turning speed of the upper-part turning body 3 in the clockwise direction (reverse direction) starts to decrease. Thereby, the difference output from the subtractor 62 gradually decreases, and the correction torque current command value output from the torque current command correction part 65 also gradually decreases. As mentioned above, the turning motion in the clockwise direction (reverse direction) is suppressed.

It should be noted that the turning in the reverse direction is stopped when the drive torque generated in the drive shaft of the turning electric motor 21 is balanced with the gravity of the upper-part turning body 3. Because the balanced position is determined by the slope angle and the inertia moment of the upper-part turning body 3, there may be a case where it is balanced when an amount of operation of the lever 26A is within the zero speed command region or it is balanced when an amount of operation of the lever 26A further increases and enters in the counter-clockwise turning drive region. Because the turning in the reverse direction is suppressed by the correction torque current command value created by the drive command correction part 60 until an amount of operation of the lever 26A reaches the balanced position, the turning operation in the counter-clockwise direction can be done by the operator increasing the amount of operation of the lever 26A.

Thereafter, when the upper-part turning body 3 turns in the counter-clockwise direction, the correction process by the drive command correction part 60 is not performed in the turning drive control apparatus 40, and a process that is the same as that on a flat ground is performed.

It should be noted that a case where clockwise direction turning is performed in order to turn the upper-part turning body 3 in a direction in which the boom 4, the arm 5 and the bucket 6 having a large weight move upward along the slope corresponds to the above-mentioned case with the counter-clockwise direction and the clockwise direction being counterchanged, and description thereof is omitted.

As mentioned above, according to the construction machine including the turning drive control apparatus, because the drive torque of the turning electric motor 21 is corrected by the correction torque current command value created by the drive command correction part 60 if turning of the upper-part turning body 3 in a direction opposite to the turning operation direction is detected, the turning in the direction opposite to the turning operation direction can be suppressed even if the inertia moment of the upper-body turning body 3 is large when the upper-part turning body 3 is caused to move a heavy load such as the boom 4 on a sloping ground. Thereby, the turning drive control apparatus and the construction machine, which can realize a smooth start of motion, can be provided.

It is considered that there is a method to suppress a turning motion in a reverse direction to a turning operation direction by increasing a gain of the PI control in the PI control part 52 or 56. However, because a torque current command value is computed based on a speed command (input by an operator) by the PI control using an increased gain in such a method, an overshoot in the PI control may occur and the torque command value hardly converges with a target value, and, thereby, there is an issue that it is difficult to realize a smooth turning motion.

On the other hand, the construction machine including the construction machine of the present embodiment can provide a turning motion with a smooth start of motion and a comfortable ride because a turning motion in a reverse direction to the turning operation direction is suppressed by the correction torque current command value computed by the drive command correction part 60 without increasing a gain of the PI control in the drive command creation part 50 as mentioned above.

Although a description has been given of a case where the resolver 22 and the turning motion detection part 58 are used to control the rotation speed of the turning electric motor 21, which is an AC-motor PWM-driven by the inverter 20, the turning electric motor may be a DC-motor. In such a case, the inverter 20, the resolver 22 and the turning motion detection part 58 are not needed, and a value detected by a tachometer generator of the DC-motor may be used as a rotation speed.

Moreover, although a description has been given of a case where the drive command correction part 60 includes the correction zero speed command creation part 61 so that the correction zero speed command for computing the correction torque current command value is created inside the drive command correction part 60, the drive command correction part 60 may not include the correction zero speed command creation part 61 so that the correction zero speed command is supplied from outside the drive command correction par 60.

Moreover, although a description has been given of a case where a PI control is used for computing the torque current command, a robust control, an adaptive control, a proportional control or an integration control may instead be used.

Moreover, although a description has been given using the hybrid-type construction machine, an object to which the turning drive control apparatus of the present embodiment is applied is not limited to the hybrid-type if it is a construction machine of which a turning mechanism is motorized.

Although a description has been given of the turning drive control apparatus and the construction machine using that according to the embodiment as an example, the present invention is not limited to the specifically disclosed embodiments, and variations and modifications may be made without departing from the scope of the claims.

The present international application claims a priority based on Japanese patent application No. 2007-271656 filed on Oct. 18, 2007, the entire contents of Japanese patent application No. 2007-271656 are incorporated herein by reference.

The invention claimed is:

1. A turning drive control apparatus that controls a drive of a turning mechanism of a construction machine driven to turn by an electric motor, comprising:

a drive command creation part configured to create a drive command to drive said single electric motor based on an amount of operation input through an operation part of the construction machine;

a turning motion detection part configured to detect a turning motion of said turning mechanism; and a drive command correction part configured to retain a plurality of different output characteristics corresponding to turning directions with respect to said single electric motor, wherein said drive command correction part outputs a correction command based on one of the output characteristics to correct said drive command, when a turning motion in a direction opposite to a turning operation direction input to said operation part is detected by said turning operation direction in response to a degree of the turning motion in the direction opposite to the turning operation direction, and wherein the output characteristics retained by said drive command correction part includes an output characteristic that maintains said drive command created by said drive command creation part when a turning direction input to said operation part is coincident with a turning direction detected by said turning motion detection part.

2. The turning drive control apparatus as claimed in claim 1, wherein said drive command correction part corrects said drive command based on a zero speed command to set a rotation speed of said electric motor to zero and a degree of the turning motion detected by said turning motion detection part.

3. The turning drive control apparatus as claimed in claim 2, wherein said drive command correction part is configured to compute a value of the drive command for correction based on a value of said zero speed command and a value representing the degree of the turning motion detected by said turning motion detection part in order to add the value of said drive command for correction to the value of the drive command created by said drive command creation part when a direction of the turning motion detected by said turning motion detection part is the direction opposite to said turning operation direction, and set the value of said drive command for correction added to the value of said drive command to zero when a direction of the turning motion detected by said turning motion detection part is coincident with said turning operation direction.

4. The turning drive control apparatus as claimed in claim 3, wherein a first control gain of said drive command correction part to compute a value of said drive command for correction is set larger than a second control gain of said drive command creation part to crate said drive command.

5. A construction machine comprising the turning drive control apparatus as claimed in claim 1.

* * * * *